No. 661,604. Patented Nov. 13, 1900.
P. GRABLER.
PIPE HANGER.
(Application filed Nov. 2, 1898. Renewed Apr. 21, 1900.)

(No Model.) 2 Sheets—Sheet 1.

WITNESSES: INVENTOR
P. Grabler
BY
ATTORNEYS.

THE NORRIS PETERS CO., PHOTO-LITHO., WASHINGTON, D. C.

No. 661,604. Patented Nov. 13, 1900.
P. GRABLER.
PIPE HANGER.
(Application filed Nov. 2, 1898. Renewed Apr. 21, 1900.)

(No Model.) 2 Sheets—Sheet 2.

WITNESSES:
J. P. Appleman
E. M. Kitchin

INVENTOR
Peter Grabler
BY
H. C. Evert & Co.
ATTORNEYS.

THE NORRIS PETERS CO., PHOTO-LITHO., WASHINGTON, D. C.

UNITED STATES PATENT OFFICE.

PETER GRABLER, OF MANSFIELD, OHIO.

PIPE-HANGER.

SPECIFICATION forming part of Letters Patent No. 661,604, dated November 13, 1900.

Application filed November 2, 1898. Renewed April 21, 1900. Serial No. 13,769. (No model.)

*To all whom it may concern:*

Be it known that I, PETER GRABLER, a citizen of the United States of America, residing at Mansfield, in the county of Richmond and State of Ohio, have invented certain new and useful Improvements in Pipe-Hangers, of which the following is a specification, reference being had therein to the accompanying drawings.

My invention relates to certain new and useful improvements in pipe hangers or hooks.

One object of my invention is to provide a hook or hanger which when placed in position on the wall will securely hold the pipe in the desired manner.

A further object of my invention is to provide a hook or hanger of this character with means to prevent the splitting of the wood to which it is adapted to be secured when the screw or other fastening means is inserted through the supporting extension of the hook or hanger.

A further object of my invention is in my method of obtaining a proper bend for a pair of barbs which are formed integral with the upper end of the supporting extension of the hook or hanger, which consists in bending a strip of metal forming the hook or hanger in the desired manner before the cutting of the barbs.

A further object of my invention lies in the fact of the saving of metal when forming my improved hook or hanger, as the securing end of the pipe is the portion which is cut away from between the ends of the converging barbs of the preceding hanger formed from the strip of metal.

Briefly described, my invention consists of an elongated flat strip of suitable metallic material having a pair of converging barbs formed integral with the supporting extension and having formed integral with its lower end the securing or fastening support for the pipe.

My invention finally consists in the novel arrangement to be hereinafter more specifically described, and particularly pointed out in the claim hereunto appended.

In describing the invention in detail reference is had to the accompanying drawings, forming a part of this specification, wherein like numerals of reference indicate the corresponding parts throughout the several views thereof, and in which—

Figure 1:
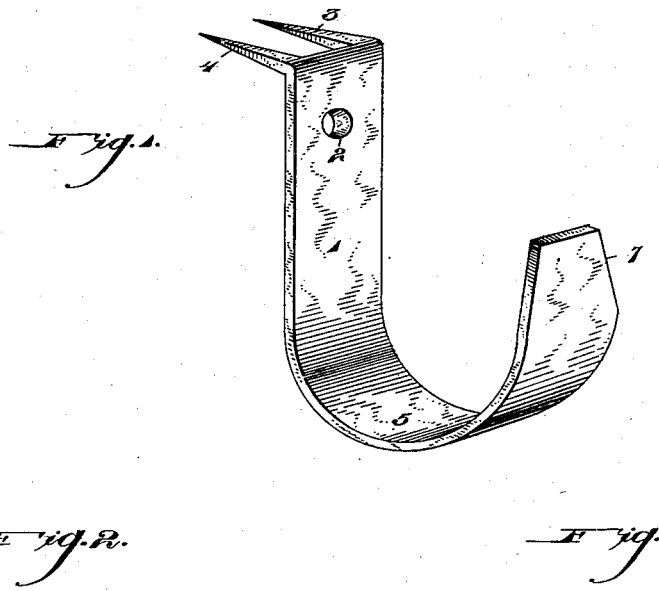
Figures 2, 3:
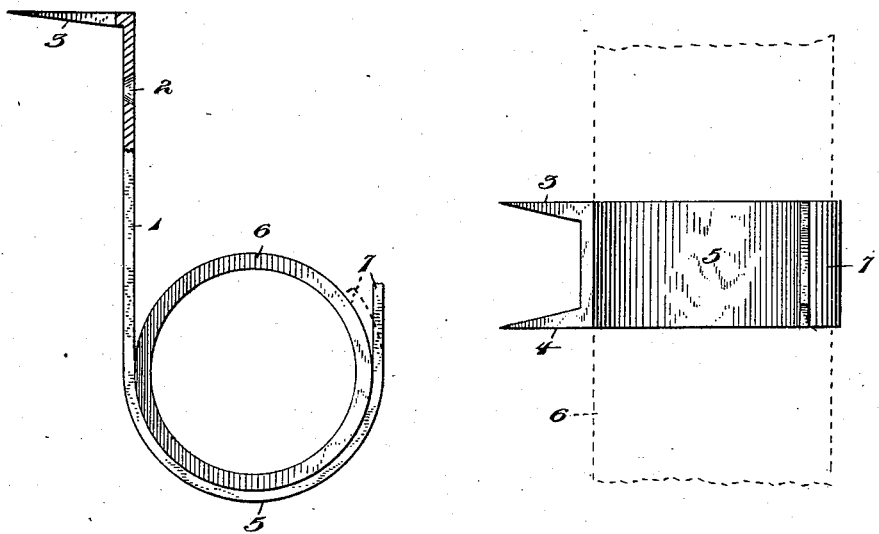
Figure 4:
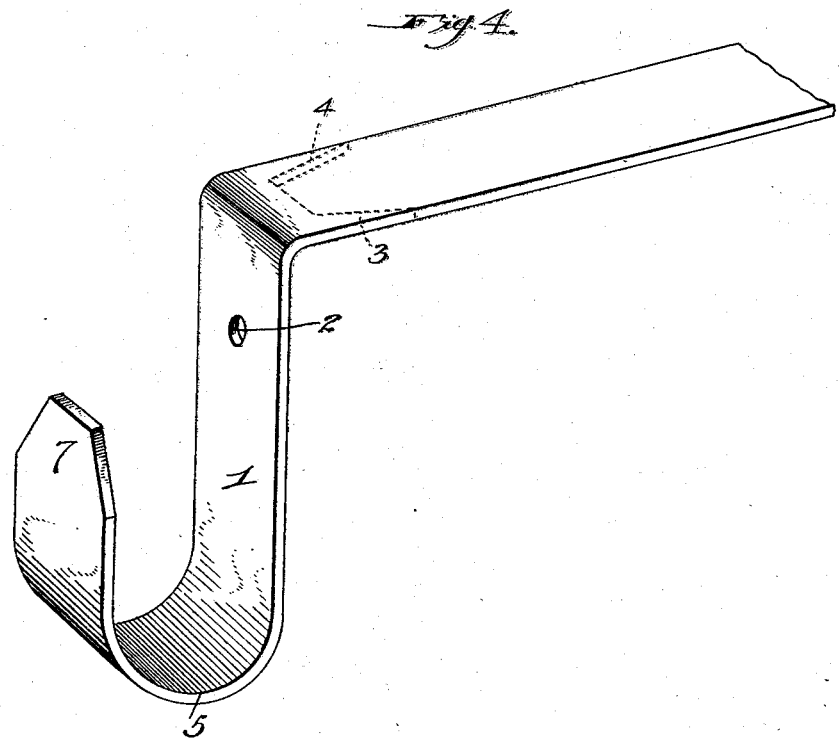

Figure 1 is a perspective view of my improved pipe hanger or hook. Fig. 2 is a side view, partly in section, of my improved pipe hanger or hook, showing the securing end fastened to the pipe in dotted line. Fig. 3 is a top plan view of my improved pipe hanger or hook, showing the pipe secured thereto in dotted line. Fig. 4 is a perspective view of a strip of metal such as is used for making my improved hanger, showing one end thereof formed into the support for the pipe and showing in dotted lines the manner in which the barbs are cut and the manner in which the supporting end of the succeeding hanger is shaped.

Referring now to the drawings by reference-numerals, 1 indicates the supporting extension, having an aperture 2 formed therein to receive the screw or other fastening means.

To construct my improved pipe-hanger, I provide an elongated metallic strip which may be of the desired thickness of metal. Before the hanger is bent to the shape or form in which it is employed I cut or form the fastening-barbs 3 and 4 and also shape the end 7 of the succeeding hanger by means of a die, with which the strip is cut. This die is so shaped as to form the inner edge of the barbs at an incline to the outer edge thereof or to the outer edge of the strip, the width of the opening made between the barbs at their base being less than the width of the said opening at their free ends, thus making the barbs substantially wedge-shaped in form. The end 7 of the hanger, it will be observed, is of the same shape as the space between the barbs from which it has been cut by the die, and after the strip has been so cut it is bent to form the vertical supporting extension 1 and gradually curved into the supporting hook or support 5, which receives the pipe 6. This supporting end of the hanger may be shaped, as shown in Fig. 4 of the drawings, before the barbs are cut, if desired. I preferably provide the extension 1 with an aperture 2 a short distance below the base of the barbs for the reception of a screw or other fastening means by which the supporting extension may be held firmly against the wall. By reason of the peculiar shape of the barbs and the manner of cutting the same, consequently shaping and reducing the end 7, this end may be readily bent down upon the pipe, as shown in dotted lines in Fig. 2 of the drawings, after the pipe has been placed therein, thus securely retaining the same in its position. Owing to the substantially wedge shape into which the barbs are formed by the manner of cutting the strip these barbs will not have the same action upon the grain of the wood into which they are driven as would be the case were both edges of the barbs on a plane; but the inclined edge of the barbs will serve to compress the grain of the wood between the barbs as the latter are driven in, and the splitting of the wood thereby obviated. This compressing of the grain of the wood also prevents the splitting of the latter when the screw or other fastening means is inserted through the aperture 2 and into the wood, as this screw will enter the wood at a point where the grain has been compressed by the barbs to a sufficient extent to prevent the splitting of the same.

It will be observed that in thus forming a number of the hangers from the flat elongated strip the end 7 of one hanger is cut from between the barbs of a preceding hanger and that any waste whatever of the metal is thus obviated.

It will be noted that various changes may be made in the details of construction, such as in the exact formation of the barbs and the consequent shape of the end of the supporting-hook or in like details, without departing from the general spirit of my invention.

Having now fully described my invention, what I claim as new, and desire to secure by Letters Patent, is—

A pipe-hanger comprising in its construction an elongated strip of metal which is shaped to form a vertical portion having its lower part hook-shaped and the end thereof reduced, the other end of the vertical portion having a pair of barbs formed integral therewith and extending at right angles thereto, said barbs having their inner edges at an incline to their outer edges to compress the wood between the barbs when driven therein, said vertical portion having an aperture underneath the barbs to receive fastening means adapted to enter the wood, the location of the said aperture being such that the compression of the wood by the barbs prevents splitting of the same when the fastening means is inserted therethrough into the wood, substantially as set forth.

In testimony whereof I affix my signature in the presence of two witnesses.

PETER GRABLER.

Witnesses:
H. H. PATTERSON,
N. L. BOGAN.